Aug. 28, 1956  R. M. BUTLER ET AL  2,760,375
APPARATUS FOR DENSITY MEASUREMENT AND CONTROL
Filed April 20, 1955
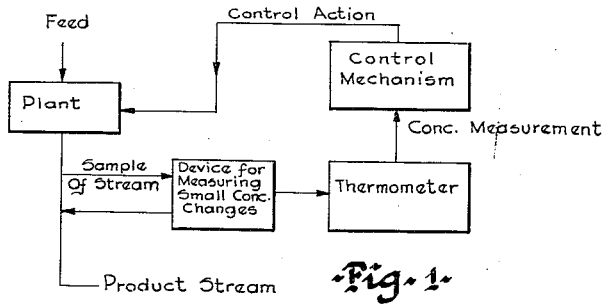
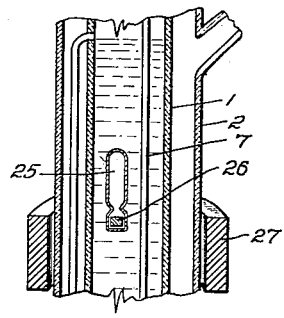
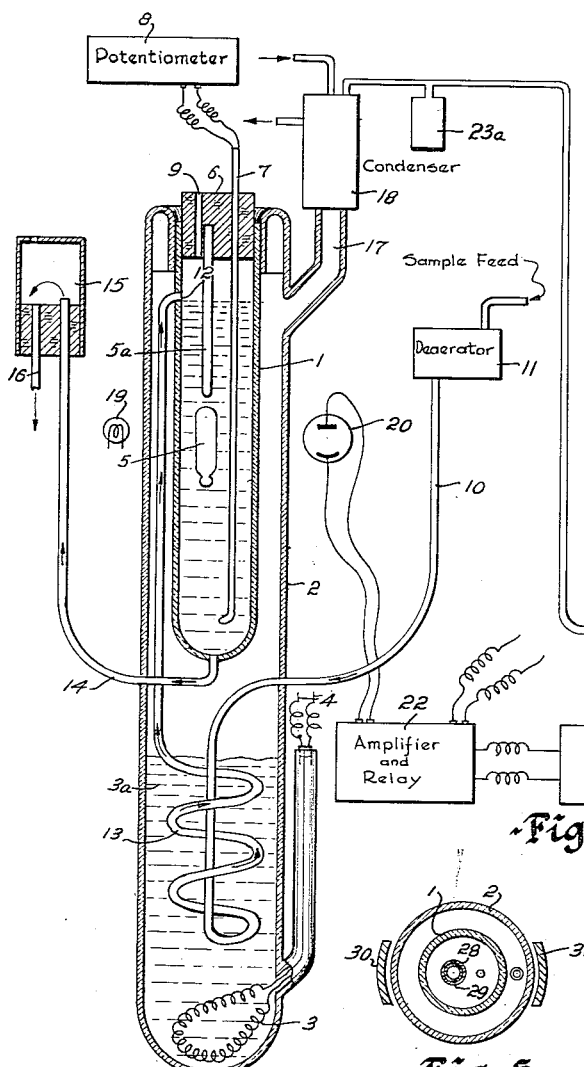
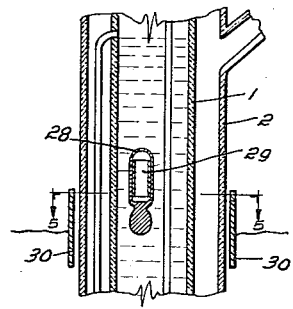
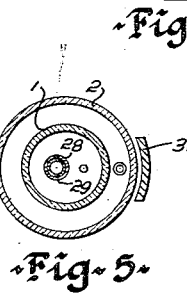
INVENTORS:
Roger M. Butler and
BY Argyle Campbell Plewes
Alex E. MacRae
Attorney.

United States Patent Office 2,760,375
Patented Aug. 28, 1956

2,760,375

APPARATUS FOR DENSITY MEASUREMENT AND CONTROL

Roger M. Butler and Argyle Campbell Plewes, Kingston, Ontario, Canada, assignors to Queen's University, Kingston, Ontario, Canada Application April 20, 1955, Serial No. 502,568

6 Claims. (Cl. 73—453)

This invention relates to the measurement and control of the density of a liquid under production or treatment for the purpose of maintaining the character of the liquid constant. It is useful in any application in which it is desired to keep the concentration of the flowing liquid at a constant level, as for example, in the production of pure liquid chemicals and in the testing of fluid streams from refineries and dehydration columns.

The object of the invention is to provide apparatus for measuring and controlling the density of liquid by continuously passing a sample stream of the liquid through a control chamber, continuously controlling the temperature of the liquid in the chamber to maintain its density at a desired fixed level and measuring the temperature variations in the liquid in the chamber. These variations in temperature are utilized to operate known plant control devices to insure maintenance of the constant character of the plant liquid with great precision and ease.

The apparatus comprises a chamber to receive the liquid, a bob in the chamber, means for maintaining the bob at a predetermined level including heating means and means responsive to changes in the bob level, caused by variation in density of the liquid for adjusting the heat control of the heating means, and means for recording changes in temperature of the liquid in the chamber. Electrical means are arranged to be activated by movement of the bob to drive a pump to control the pressure on, and thus the boiling point of, liquid in the heater through which the sample stream is lead to adjust the temperature of the liquid in the bob chamber and thus retain the bob at the desired level.

Various control devices, some of which use a floating bob, are known in the art. The particular advantage of the present invention is that it automatically and accurately provides precise density control of the fluid under production because it responds readily to small changes in concentration.

The invention is now described in relation to the accompanying drawing in which:

Figure 1 diagrammatically represents the operating circuit,

Figure 2 is a sectional elevation of the control device,

Figure 3 is a partial sectional elevation of another form of the bob activating means, Figure 4 is a partial sectional elevation of a third form of the bob activating means, Figure 5 is a section on line 5—5 of Figure 4.

Referring particularly to Figure 2, a bob chamber 1 is located in the upper end of an elongated cylindrical chamber 2 having a heater 3 in its lower end with external leads 4 to be connected to a source of electricity. The heater 3 is arranged to maintain in constant boiling condition a quantity of liquid 3a, such as water in the lower portion of chamber 2. A bob 5 is located in the bob chamber. Projecting into the bob chamber through a stopper 6 is a thermocouple 7 connected to a recording potentiometer 8 of well known construction. 9 is a vent in the stopper. The lower end of the thermocouple is preferably located adjacent the bottom of the bob chamber. A conduit 10 leads a sample stream of the liquid under production or treatment preferably through a deaerator 11 to the top of the bob chamber at 12. The conduit has a coil 13 immersed in the liquid 3a. The sample stream flows from the bottom of the bob chamber through a conduit 14 which is connected to a liquid level control device 15 to maintain constant the level of sample liquid in the bob chamber. The sample stream returns to the plant through a pipe 16 leading from the level control device 15. The chamber 2 has a passage 17 leading to a condenser 18 which receives vapour from the heater liquid 3a. The chambers 1 and 2 are preferably formed of transparent material, such as glass.

In accordance with the invention, the bob 5 is maintained at a substantially constant level in the chamber 1 regardless of the density of the sample liquid therein by means, preferably electrical. The fluctuations of the bob caused by changes in density of the sample liquid actuate such electrical means to return the bob to its predetermined level. A stop 5a is provided in the bob chamber 1 to prevent the bob from reaching the surface of the liquid therein.

In the modification shown in Figure 2 the bob is of opaque character and may be formed of glass rendered opaque in a suitable manner as by a metallic lining. A light source 19 is located opposite the bob on one side of chamber 2 and a photoelectric or like cell 20 is located on the other side of chamber 2 in opposed relation to the light source 19, whose light beam is thus interrupted by the opaque bob in the predetermined position thereof. When the bob moves out of the light beam in response to a change in density of the liquid sample, the cell 20 is energized to actuate a vacuum pump 21 through an amplifier and relay 22. The vacuum pump 21 is connected to the space above the boiling liquid in chamber 2 by a pipe 23 through condenser 18. A capacity tank 23a is connected to pipe 23. The pump 21 varies the pressure on the boiling liquid 3a and the temperature of such liquid 3a and consequently that of the sample liquid in the bob chamber to return the bob to its predetermined level. Preferably, the pipe 23 is led through a mercury or like non-return valve 24, a needle valve 24a being connected in parallel therewith and a needle valve 24b being connected in series therewith, to eliminate any trouble caused by pressure in the vacuum line rising more rapidly when the pump is off then it falls when the pump is on.

It will be apparent that the resultant changes in temperature in the sample liquid in the bob chamber 1 will cause the thermocouple 7 to actuate the temperature responsive means such as the potentiometer 8 or thermometer, as indicated in Figure 1. The temperature responsive means is connected to known control mechanism, as indicated in Figure 1, to effect the required control in the plant.

It will be apparent that various bob-actuated means, other than the photoelectric means described, may be provided to maintain the bob level. Figure 3 illustrates a modification wherein a bob 25 is provided with an iron core 26. A coil 27 is wound about chamber 2 whereby changes in the position of the bob will alter the inductance of the coil 27. The coil 27 is connected through a conventional relay circuit responsive to changes in inductance to operate the vacuum pump 21.

Figures 4 and 5 illustrate a modification in which a bob 28 is provided with an aluminum foil lining 29. A pair of electrodes 30 are positioned on chamber 2 whereby the electrical capacity between the two electrodes will change as the bob moves. The change in capacity is used to operate a conventional relay circuit as before.

It will be apparent that the device described may be employed to maintain desired concentration of a liquid in an effective, constant and accurate manner. The use of temperature in association with a bob makes it possible to measure and control such concentration to a relatively minute degree.

One example of use of the device is in the production of nitration grade ethylene glycol. Assuming that the glycol must not contain more than 0.2% water, and should the concentration of the product in the plant and in the sample body in the bob chamber 1 change from say 99.8 to 99.6%, a fall in temperature in the sample body will occur by reason of movement of the bob and adjustment of pressure thereby in the device. With the normal temperature of the sample body at 160° F., such a concentration change would cause a drop in such temperature to about 158° F.

Obviously the scale of the temperature indicator may, if desired, be calibrated directly in terms of concentration. Such a temperature drop would be utilized to actuate the known control mechanism to immediately bring the plant product back up to the required concentration.

We claim:

1. Apparatus for measuring the density of a liquid, which comprises a bob chamber, means for continuously passing a sample stream of said liquid through said bob chamber to maintain a sample body of liquid therein, a bob in said chamber for disposition at a predetermined level in said body of liquid at predetermined temperature and density thereof, a second chamber surrounding said bob chamber and having heating means therein to heat said body of liquid to said predetermined temperature, means for adjusting the pressure in said second chamber, means actuated by movement of said bob in response to density changes in said sample body for operating said pressure adjusting means to change the temperature of said sample body and return said bob to said predetermined level, and means for measuring said temperature changes.

2. Apparatus for measuring the density of a liquid as defined in claim 4, wherein said bob-actuated means comprises electrical means responsive to movement of said bob, and a vacuum pump operated by said electrical means.

3. Apparatus for measuring the density of a liquid comprising a bob chamber, a conduit for continuously feeding a sample stream of said liquid through said chamber to provide a sample body of liquid therein, a bob in said chamber for disposition in said sample body, a heating chamber surrounding said bob chamber and a heating liquid therein, said conduit extending through said heating liquid prior to entrance to said bob chamber, electrical means responsive to movement of said bob from a predetermined level in said sample body, a vacuum pump for varying the pressure on said heating liquid, said vacuum pump being operable in response to energization of said electrical means, and means for measuring the temperature of said sample body.

4. Apparatus for measuring the density of a liquid as defined in claim 6, said chambers being formed of transparent material, said bob being opaque, and said electrical means comprising a light source on one side of said chambers, light responsive means on the opposite side of said chambers and arranged to receive a beam of light from said source, said bob normally interrupting the beam of light from said source, and a relay arranged for energization by said light responsive means.

5. Apparatus for measuring the density of a liquid as defined in claim 6 said electrical means comprising an iron core in said bob, an inductance coil on said heating chamber, and a relay operable in response to inductance changes in said coil.

6. Apparatus for measuring the density of a liquid as defined in claim 6, said electrical means comprising a metallic foil lining in said bob, and a pair of electrodes disposed on opposite sides of said heating chamber, the electrical capacity of said electrodes being variable by movement of said bob therebetween.

References Cited in the file of this patent
UNITED STATES PATENTS

| | | |
|---|---|---|
| 302,539 | Bobrick | July 29, 1884 |
| 1,495,314 | Walker | May 27, 1924 |
| 1,578,208 | Richardson | Mar. 23, 1926 |
| 2,273,850 | Eward | Feb. 24, 1942 |
| 2,382,648 | Martin | Aug. 14, 1945 |
| 2,416,808 | Weiss | Mar. 4, 1947 |
| 2,635,461 | Groth et al. | Apr. 21, 1953 |